(12) United States Patent
Lee (10) Patent No.: US 6,317,460 B1
(45) Date of Patent: Nov. 13, 2001

(54) MOTION VECTOR GENERATION BY TEMPORAL INTERPOLATION

(75) Inventor: Jungwoo Lee, Princeton, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/076,441

(22) Filed: May 12, 1998

(51) Int. Cl.$^7$ ........................................... H04N 7/36
(52) U.S. Cl. .................. 375/240.16; 375/240.12; 348/699
(58) Field of Search ................. 375/240, 240.12, 375/240.16; 348/416, 413, 402, 699, 402.1, 413.1, 416.1; H04N 7/36

(56) References Cited

U.S. PATENT DOCUMENTS

| | | | |
|---|---|---|---|
| 5,648,819 | * 7/1997 | Tranchard | 348/416 |
| 5,687,097 | * 11/1997 | Mizusawa et al. | 345/474 |
| 5,745,183 | * 4/1998 | Lam | 348/416 |
| 5,768,430 | * 6/1998 | Takashima et al. | 382/236 |

FOREIGN PATENT DOCUMENTS

| | | |
|---|---|---|
| 0 675 652 A | 10/1995 | (EP). |
| 0 701 378 A2 | 3/1996 | (EP). |
| 0 762 776 A2 | 3/1997 | (EP). |

OTHER PUBLICATIONS

Wei B Wy et al: "Video Coding for HDTV Systems" Proceedings of the Annual International Computer Software and Applications Conference (COMPSAC), Taipei, Nov. 9–11, 1994 No. Conf. 18, Nov. 9, 1994, pp. 469–475, XP000531343 Institute of Electrical and Electrontronics Engineersisbn: 0–8186–6707–9 p. 471, left–hand col., line 15– right–hand col., line 4 figures 3–6.

Atul Puri et al: "Adaptive Frame/Field Motion Compensated Video Coding" Signal Processing. Image Communication, vol. No. 1/02, Feb. 1, 1993, pp. 39–58, XP000345612 ISSN: 0923–5965 paragraph '0003!

PCT International Search Report PCT/US99/10499 Corresponding to 09/076,441.

* cited by examiner

Primary Examiner—Howard Britton
(74) Attorney, Agent, or Firm—William J. Burke (57) ABSTRACT

In an image encoding scheme (e.g., MPEG-2) in which two or more different sets of motion vectors are generated for each image that is to be encoded using motion estimation, one or more sets of motion vectors are generated by applying temporal scaling to one or more other sets of motion vectors that may be generated using conventional motion estimation techniques. Using such a temporal interpolation scheme to generate one or more of the sets of motion vectors for each image can greatly reduce the processing load on an image encoding system for motion estimation processing. Local motion estimation can optionally be performed on the estimates generated using temporal interpolation to select final motion vectors, e.g., for use in subsequent image compression processing that relies on motion compensation.

26 Claims, 5 Drawing Sheets

MOTION VECTOR GENERATION BY TEMPORAL INTERPOLATION

STATEMENT REGARDING FEDERALLY SPONSORED RESEARCH OF DEVELOPMENT

The Government of the United States of America has certain rights in at least part of this invention pursuant to Cooperative Agreement No. 50NANB5H1178 awarded by the National Institute for Standards and Technology.

BACKGROUND OF THE INVENTION

1. Field of the Invention

The present invention relates to image processing, and, in particular, to motion estimation for frame and field picture coding.

2. Description of the Related Art

An image sequence, such as a video image sequence, typically includes a sequence of image frames. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, a frame sequence may be compressed such that redundant information within the sequence is not stored or transmitted. As such, image sequence compression through various encoding techniques has been the subject of a great deal of research in recent years. Digital television, video conferencing, and CD-ROM archiving are applications that can benefit from video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation. In a sequence containing motion from one frame to the next in an image sequence, a current frame can be reconstructed using a preceding frame and motion information representing the motion-compensated difference between the current frame and the preceding frame. For example, in a video transmission system, at the transmitter, a current frame is compared to a preceding frame to determine motion information. Thereafter, the transmitter transmits the preceding frame and the motion information to a receiver. At the receiver, the current frame is reconstructed by combining the preceding frame with the motion information. Consequently, only one frame and the motion information is transmitted and received rather than two entire frames. In applications such as video conferencing, video telephone, and digital television, motion information has become the key to data compression. However, extraction of the motion information from the frame sequence is itself computationally intensive, placing a heavy burden on the hardware designed to perform the motion estimation task.

Many systems determine motion information using a so-called block-based approach. In a simple block-based approach, the current frame is divided into a number of blocks of pixels (referred to as current blocks). For each of these current blocks, a search is performed within a selected search area in a reference frame (e.g., corresponding to a preceding frame in the image sequence) for a block of pixels that "best" matches the current block. This search is typically accomplished by repetitively comparing a selected current block to each similarly sized block of pixels in the selected search area of the reference frame. Once a block match is found, the location of the matching block in the search area in the reference frame relative to the location of the current block within the current frame defines a motion vector. This approach, i.e., comparing a current block to each similarly sized block in a selected search area in the reference frame, is known as the full-search or exhaustive-search approach. The determination of motion vectors by the exhaustive-search approach is computationally intensive. As such, these systems tend to be relatively slow in processing the frames and expensive to fabricate.

In conventional video sequences, each frame of image data consists of two interleaved fields—a top field corresponding to the odd rows in the frame and a bottom field corresponding to the even rows in the frame, where the top and bottom fields are generated at slightly different times. Depending on the encoding scheme, image data can be encoded based on the frames (i.e., frame picture coding) or based on the individual fields (i.e., field picture coding). Under the Motion Picture Experts Group (MPEG)-2 video compression standard, motion estimation processing for frame picture coding is different from motion estimation processing for field picture coding.

Figure 1:
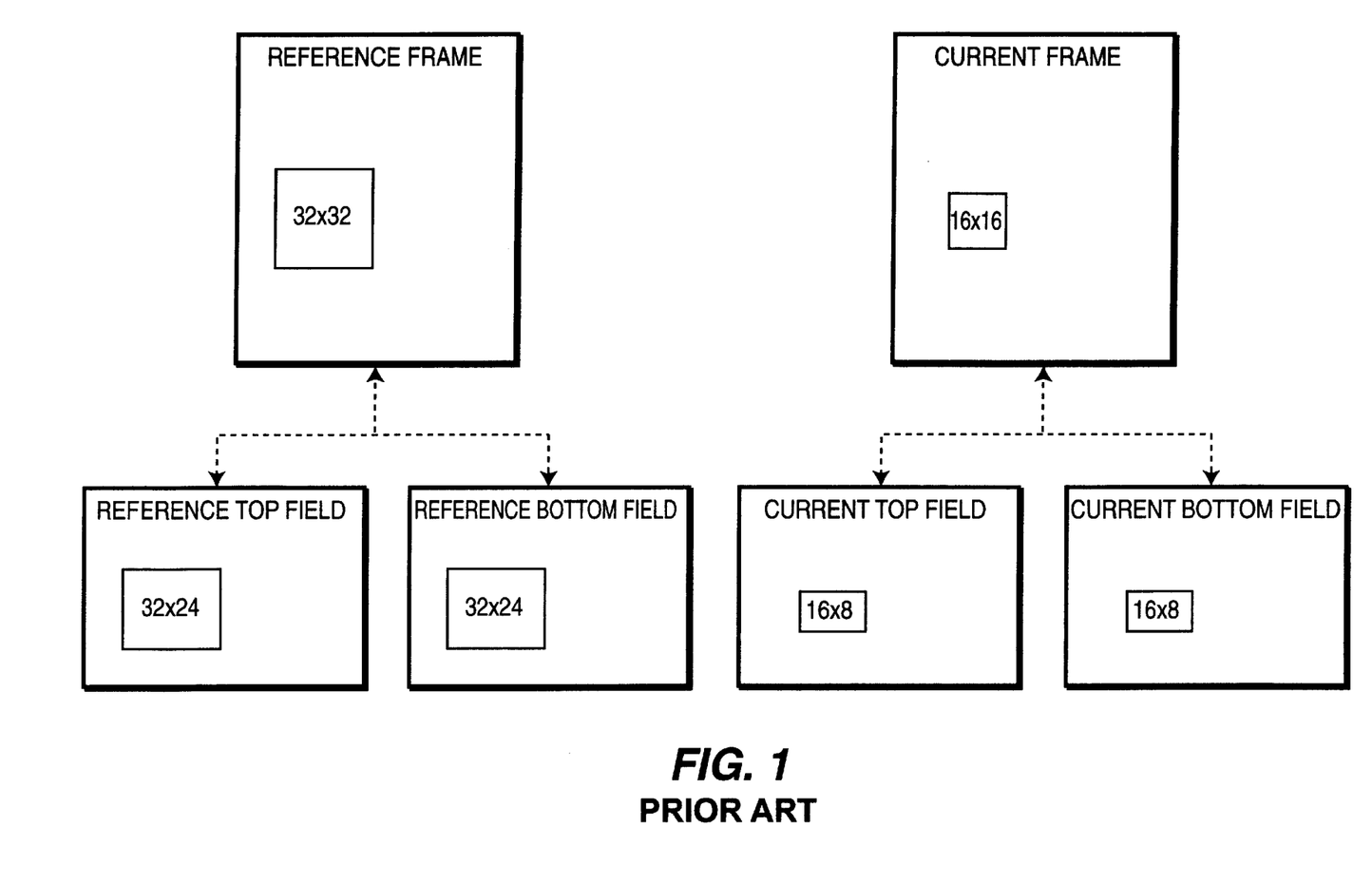
FIG. 1 illustrates the different sets of image data used for motion estimation processing for MPEG-2 frame picture coding.

FIG. 1 illustrates the different sets of image data used for motion estimation processing for MPEG-2 frame picture coding. In frame picture coding, the current frame (i.e., the frame currently being encoded) is divided into blocks (e.g., 16 pixels by 16 pixels, although other block sizes are also possible). Each (16×16) block in the current frame corresponds to a (16×8) sub-block in the top field used to form the current frame and a (16×8) sub-block in the bottom field used to form the current frame. In MPEG-2 frame picture coding, motion estimation processing is performed five times for each frame, each time comparing different sets of data from the current frame to different sets of data from the reference frame as follows:

(1) Comparing (16×16) blocks in the current frame to search areas in the reference frame to generate a set of frame vectors, where, for each current block, the search area is, for example, a (32×32) region of pixels in the reference frame centered at the corresponding location of the current block in the current frame;

(2) Comparing (16×8) sub-blocks in the top field for the current frame (referred to in FIG. 1 as the current top field) to search areas in the top field for the reference frame (referred to in FIG. 1 as the reference top field) to generate a set of top-top field vectors;

(3) Comparing (16×8) subblocks in the current top field to search areas in the bottom field for the reference frame (referred to in FIG. 1 as the reference bottom field) to generate a set of bottom-top field vectors, (4) Comparing (16×8) sub-blocks in the bottom field for the current frame (referred to in FIG. 1 as the current bottom field) to search areas in the reference top field to generate a set of top-bottom field vectors; and (5) Comparing (16×8) sub-blocks in the current bottom field to search areas in the reference bottom field to generate a set of bottom-bottom field vectors.

The (32×32) search region for motion estimation in the reference frame is based on a search range of 8 pixels in each of the positive and negative X (or width) and Y (or height) directions from the corresponding position of the (16×16) block in the current frame. Since the sub-blocks are only 8 pixels high, the search areas in the reference top and bottom fields for the same 8-pixel search range are only (32×24). Of course, search ranges and search areas of other dimensions can also be used.

Figure 2:
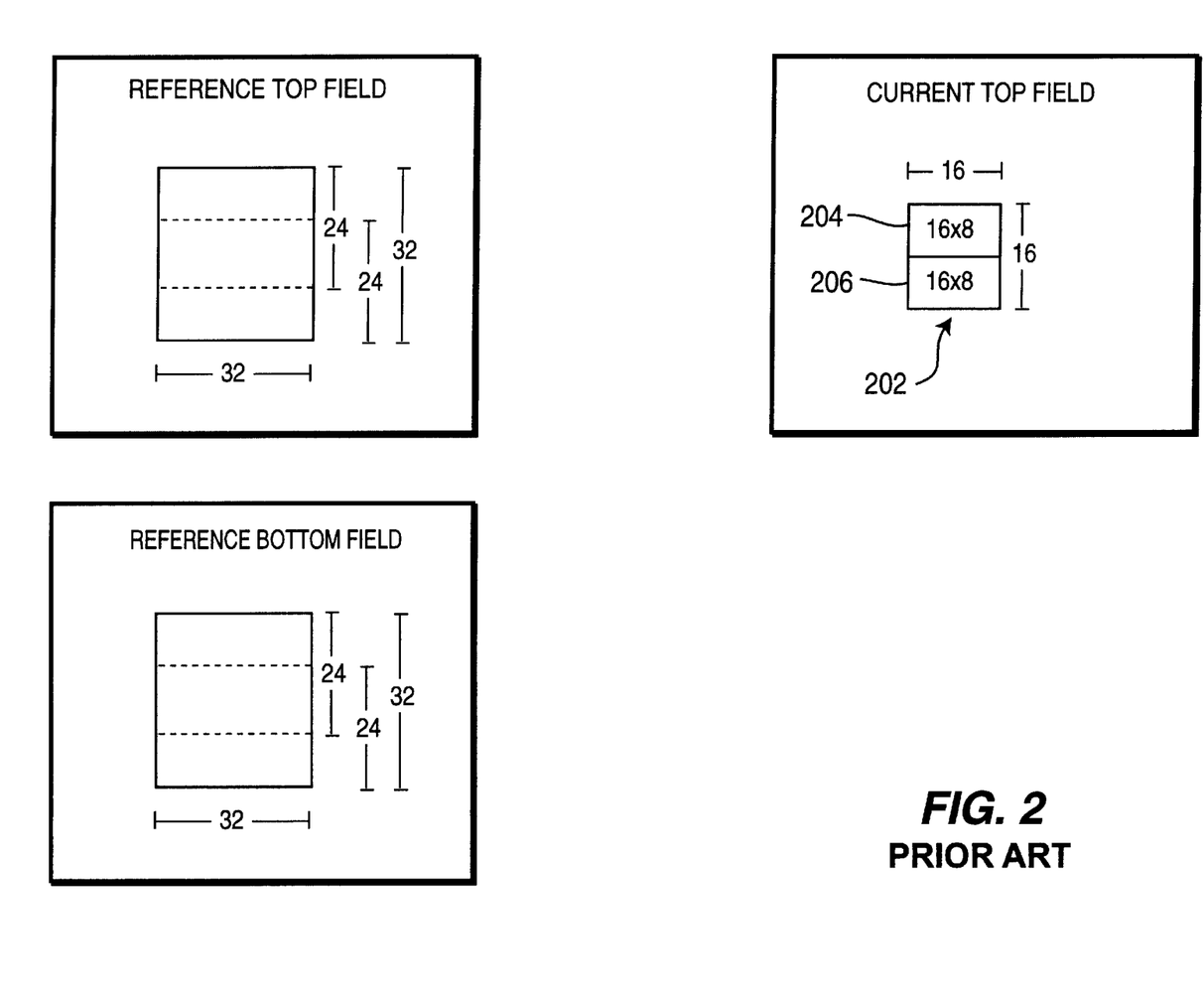
FIG. 2 illustrates the different sets of image data used for motion estimation processing for MPEG-2 field picture coding, where the current picture is a top field.

FIG. 2 illustrates the different sets of image data used for motion estimation processing for MPEG-2 field picture coding, where, for the example in FIG. 2, the current picture is a top field. In field picture coding, image data in the current field (i.e., the field currently being encoded, whether a top field or a bottom field) is compared with image data in two different reference fields: a reference top field and a reference bottom field. Each block in the current field (e.g., 16×16 block 202, although other block sizes are also possible) is further divided into an upper sub-block (e.g., 16×8 sub-block 204) and a lower sub-block (e.g., 16×8 sub-block 206). According to MPEG-2 field picture coding, motion estimation processing is performed six times for each field, each time comparing blocks of data from the current field to different sets of data from the reference fields as follows:

(1) Comparing (16×16) blocks in the current field to search areas (e.g., 32×32) in the reference top field to generate a set of top-current vectors;

(2) Comparing (16×16) blocks in the current field to search areas (e.g., 32×32) in the reference bottom field to generate a set of bottom-current vectors;

(3) Comparing (16×8) upper sub-blocks in the current field to search areas (e.g., 32×24) in the reference top field to generate a set of top-upper vectors;

(4) Comparing (16×8) upper sub-blocks in the current field to search areas (e.g., 32×24) in the reference bottom field to generate a set of bottom-upper vectors;

(5) Comparing (16×8) lower sub-blocks in the current field to search areas (e.g., 32×24) in the reference top field to generate a set of top-lower vectors; and (6) Comparing (16×8) lower sub-blocks in the current field to search areas (e.g., 32×24) in the reference bottom field to generate a set of bottom-lower vectors.

Here, too, the sizes of the blocks and sub-blocks in the current field as well as the search ranges and search areas in the reference fields can be different from those shown in FIG. 2.

Motion estimation processing can be computationally demanding for an image encoding system. Having to repeat motion estimation processing multiple times for each picture in a video sequence, whether it is five times for frame picture coding or six times for field picture coding, can greatly reduce the speed at which the video data can be encoded in a system having finite processing capacity.

SUMMARY OF THE INVENTION

The present invention is directed to schemes for reducing the computational requirements of motion estimation processing for video encoding schemes that require two or more different sets of motion vectors to be generated for each set of image data, such as in MPEG-2 frame picture coding and MPEG-2 field picture coding. According to the present invention, rather than perform conventional motion estimation processing to derive each set of motion vectors, one or more sets of motion vectors are generated by applying temporal interpolation to one or more of other sets of motion vectors, which may have been generated, for example, using conventional motion estimation techniques. Thus, under the present invention, for frame picture coding, one or more of the five sets of motion vectors are generated using temporal interpolation, while, for field picture coding, one or more of the six sets of motion vectors are generated using temporal interpolation. Since the temporal interpolation processing of the present invention is less computationally demanding than conventional motion estimation processing, die present invention reduces the computational requirements involved in motion estimation processing for encoding schemes such as MPEG-2.

According to one embodiment, M sets of motion vectors are generated for a current image, wherein each set of motion vectors corresponds to a different set of data in the current image. In particular, N sets of motion vectors are generated for the current image, N being less than M, and one or more additional sets of motion vectors are generated for the current image by temporal interpolation based on one or more of the first sets of motion vectors.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

When implemented in the context of MPEG-2 encoding, the present invention may be applied either to frame picture coding in which five sets of motion vectors are generated for each frame that is to be encoded using motion estimation or to field picture coding in which six sets of motion vectors are generated for each field that is to be encoded using motion estimation. The following sections describe schemes for implementing the present invention for MPEG-2 frame picture coding and MPEG-2 field picture coding. It will be understood, however, that the present invention can be applied to other encoding schemes in which two or more sets of motion vectors need to be generated for each set of image data.

MPEG-2 Frame Picture Coding

As described previously in relation to FIG. 1, in MPEG-2 frame picture coding, five sets of motion vectors are generated for each frame that is to be encoded using motion estimation. These five sets of motion vectors are referred to as (1) frame vectors, (2) top-top field vectors, (3) bottom-top field vectors, (4) top-bottom field vectors, and (5) bottom-bottom field vectors.

Figure 3:
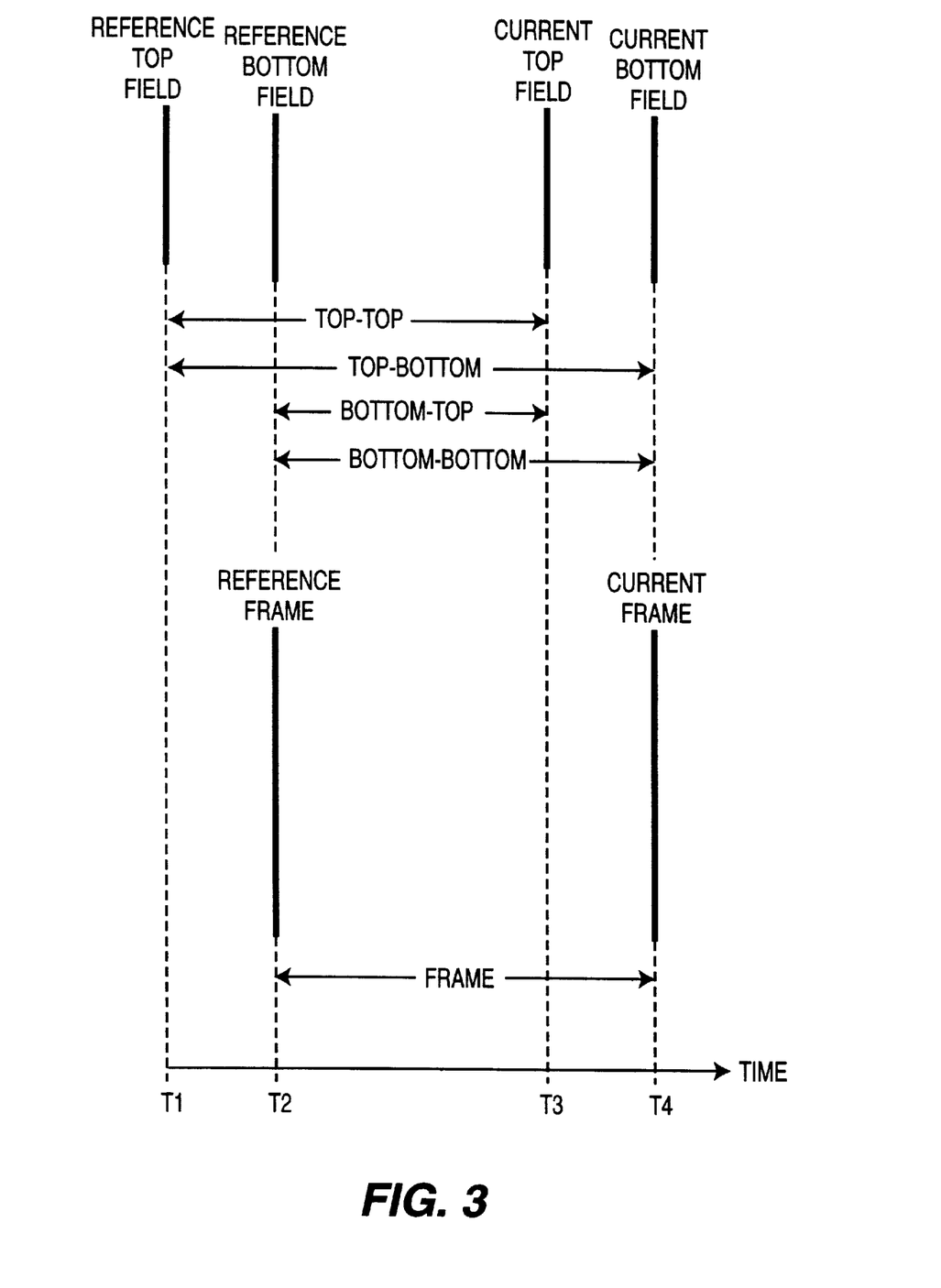
FIG. 3 represents the occurrence of current and reference frames and their associated top and bottom fields as a function of time for MPEG-2 frame picture coding.

FIG. 3 represents the occurrence of current and reference frames and their associated top and bottom fields as a function of time. In general, the reference frame may, but need not necessarily correspond to the immediately preceding frame in the video sequence. As shown in FIG. 3, the reference top field occurs at time T1, the reference bottom field and the reference frame (generated from the reference top and bottom fields) both occur at time T2, the current top field occurs at time T3, and the current bottom field and the current frame (generated from the current top and bottom fields) both occur at time T4.

Figure 4:
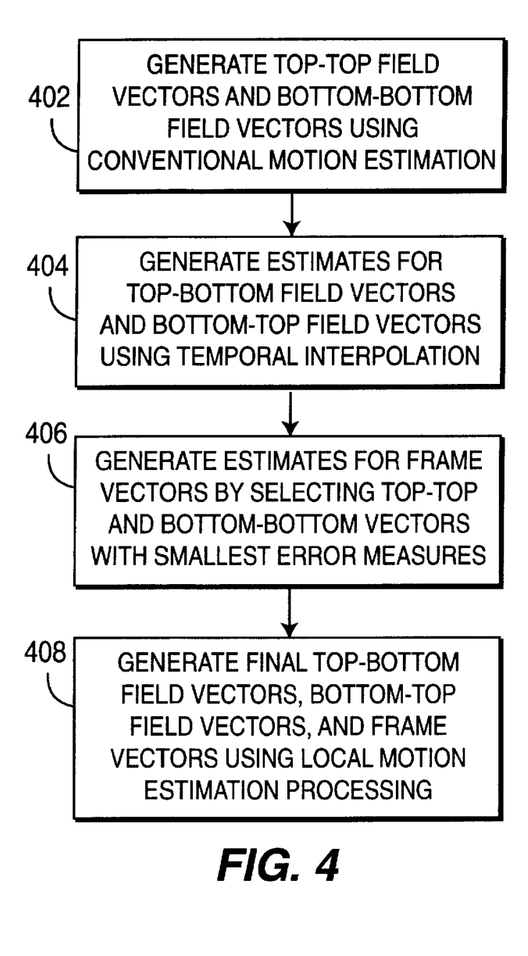
FIG. 4 shows a block diagram of the process for generating the five sets of motion vectors for MPEG-2 frame picture coding, according to one embodiment of the present invention.

FIG. 4 shows a block diagram of the process for generating the five sets of motion vectors for MPEG-2 frame picture coding, according to one embodiment of the present invention. According to this embodiment, two sets of motion vectors (i.e., the top-top field vectors and the bottom-bottom field vectors) are generated (step 402 of FIG. 4), for example, using conventional motion estimation processing in which blocks of current image data are compared to search areas of reference image data to identify a motion vector for each block of current image data. Any conventional method for performing motion estimation can be used, including the exhaustive-search approach.

Rather than performing conventional motion estimation processing to generate the remaining three sets of motion vectors (i.e., the frame vectors, the top-bottom field vectors, and the bottom-top field vectors), the top-bottom field vectors and the bottom-top field vectors are generated by applying temporal interpolation to the top-top field vectors and the bottom-bottom field vectors, respectively (step 404). The frame vectors are obtained by selecting, for each block, the motion vector with the smallest selected metric from the corresponding blocks from the top-top and bottom-bottom motion estimation processes, where the selected metric may be any conventional motion estimation criteria, such as minimum SAD (sum of the absolute differences), minimum SSD (sum of the squared differences), or minimum MAD (minimum absolute difference) (step 406).

Under temporal interpolation, the rate of motion (e.g., depicted objects within the image data) as specified by a motion vector between a current image and a reference image is assumed to be constant. As such, those motion vectors can be temporally scaled to estimate motion vectors relating other pairs of images, such as between the same current image and a different reference image or between a different current image and the same reference image or even between a different current image and a different reference image.

This temporal scaling can be implemented if the relative timing of the different sets of image data is known. For example, for the sets of image data shown in FIG. 3, estimates for the top-bottom field vectors can be generated by scaling the bottom-bottom field vectors by a temporal distance factor given by (T4−T1)/(T4−T2). Similarly, estimates for the bottom-top field vectors can be generated by scaling the top-top field vectors by a different temporal distance factor given by (T3−T2)/(T3−T1).

After estimates are generated for the frame vectors, the top-bottom field vectors, and the bottom-top field vectors, local motion estimation can be performed to generate final motion vectors for these three sets of motion vectors (step 408). Local motion estimation refers to conventional motion estimation processing using a relatively small search area centered at the estimated motion vector generated using temporal interpolation. For example, a search range of +/−2 pixels in each direction can be used for local motion estimation, although other local search ranges are also possible). The final motion vectors can be selected using conventional criteria, such as minimum SAD, SSD, or MAD. In addition, the local motion estimation processing can be terminated when the selected metric (e.g., SAD, SSD, or MAD) falls below a specified threshold level.

In the embodiment of FIG. 4, two sets of field vectors (i.e., top-bottom and bottom-top) are generated by applying temporal interpolation to two other sets of field vectors (i.e., top-top and bottom-bottom, respectively). The present invention can also be implemented using alternative schemes. For example, field vectors other than one or both of the top-bottom and bottom-top field vectors can be generated using temporal interpolation. In still other embodiments, three sets of field vectors can be generated by applying temporal interpolation to a single set of field vectors. In still other embodiments, only one set of field vectors is generated by temporal interpolation. Furthermore, the frame vectors can be used to generate one or more sets of field vectors by temporal interpolation, or alternatively the frame vectors can themselves be generated by temporal interpolation based on field vectors.

MPEG-2 Field Picture Coding

As described previously in relation to FIG. 2, in MPEG-2 field picture coding, six sets of motion vectors are generated for each field that is to be encoded using motion estimation. These six sets of motion vectors are referred to as (1) current vectors, (2) bottom-current vectors, (3) top-upper vectors, (4) bottom-upper vectors, (5) top-lower vectors, and (6) bottom-lower vectors.

Figure 5:
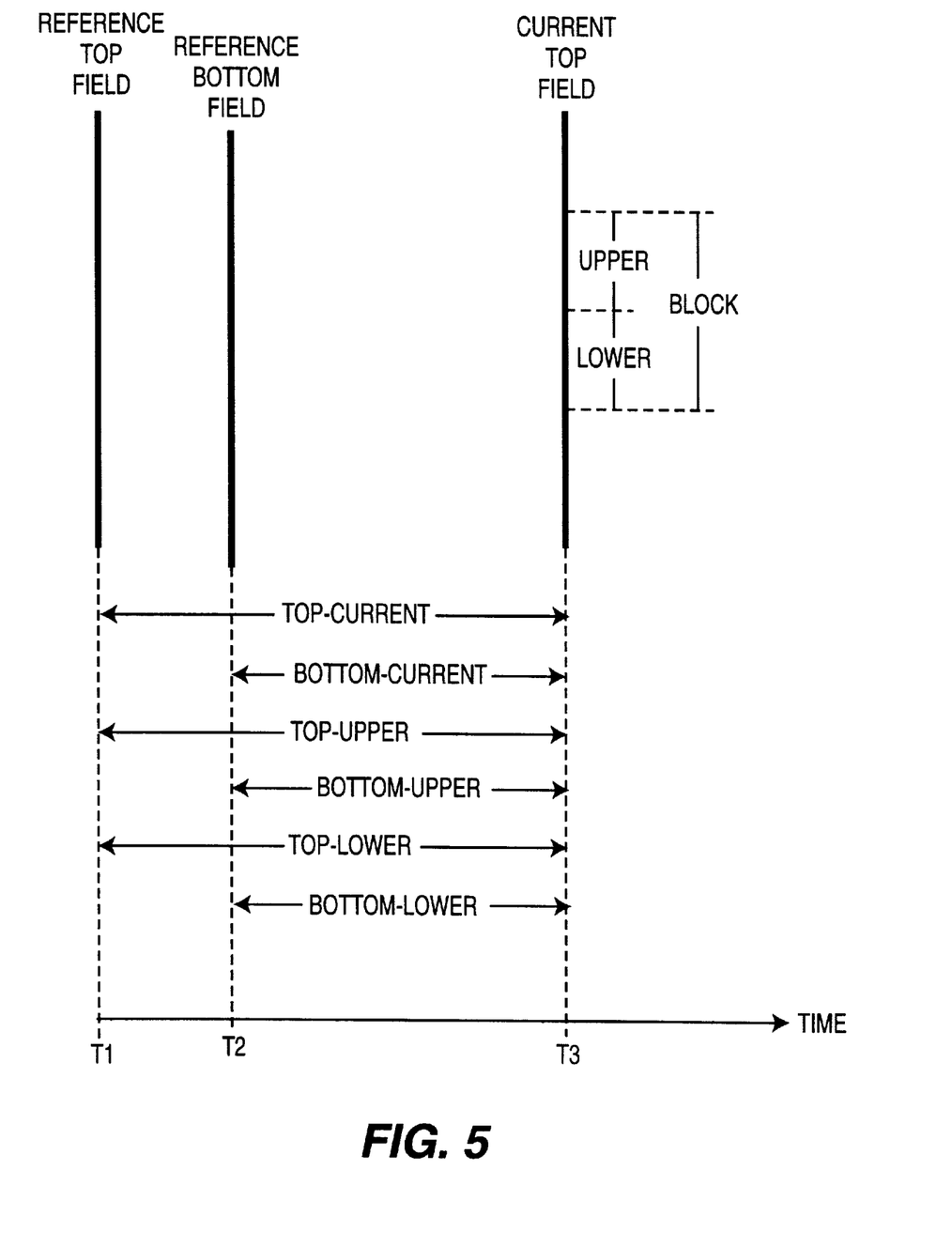
FIG. 5 represents the occurrence of the current field and reference top and bottom fields as a function of time, where the current field is a top field for MPEG-2 field picture coding.

FIG. 5 represents the occurrence of the current field and reference top and bottom fields as a function of time, where the current field is a top field. In general, the reference fields may, but need not necessarily correspond to the immediately preceding fields in the video sequence. Furthermore, the present invention may be applied when the current field is a bottom field. As shown in FIG. 5, the reference top field occurs at time T1, the reference bottom field occurs at time T2, and the current (i.e., top) field occurs at time T3.

Figure 6:
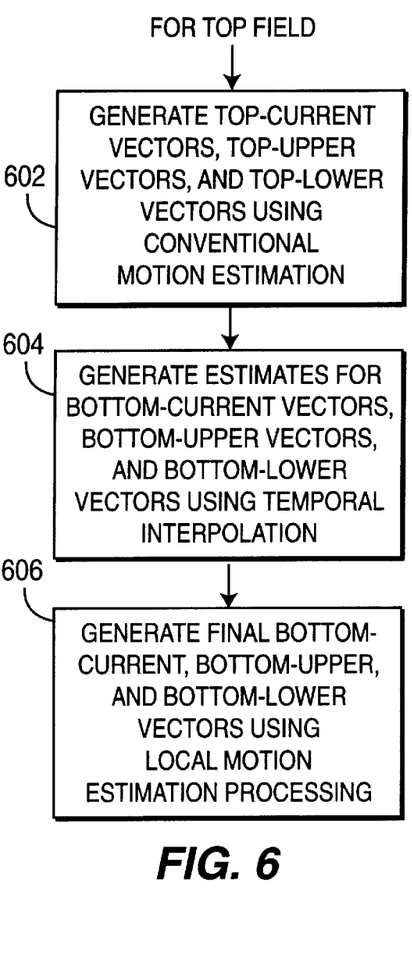
FIG. 6 shows a block gram of the process for generating the six sets of motion vectors for MPEG-2 field picture coding, where the current field is a top field, according to one embodiment of the present invention.

FIG. 6 shows a block diagram of the process for generating the six sets of motion vectors for MPEG-2 field picture coding, where the current field is a top field, according to one embodiment of the present invention. According to this embodiment, three sets of motion vectors (i.e., the top-current vectors, the top-upper vectors, and the top-lower vectors) are generated (step 602 of FIG. 6), for example, using conventional motion estimation processing in which blocks of current image data are compared to search areas of reference image data to identify a motion vector for each block of current image data. Any conventional method for performing motion estimation can be used, including the exhaustive-search approach. Rather than performing conventional motion estimation processing to generate the remaining three sets of motion vectors (i.e., the bottom-current vectors, the bottom-upper vectors, and the bottom-lower vectors), these last three sets of motion vectors are generated by applying temporal interpolation to the top-current vectors, die top-upper vectors, and the top-lower vectors, respectively (step 604). For example, for the sets of image data shown in FIG. 5, estimates for the bottom-current vectors can be generated by scaling the top-current vectors by a temporal distance factor given by (M3–T2)/(T3–T1). Similarly, estimates for the bottom-upper vectors and the bottom-lower vectors can be generated by scaling the top-upper vectors and the top-lower vectors, respectively, by the same temporal distance factor. After estimates are generated for the bottom-current, bottom-upper, and bottom-lower vectors using temporal interpolation, local motion estimation can be performed to generate final motion vectors for these three sets of motion vectors (step 606).

Figure 7:
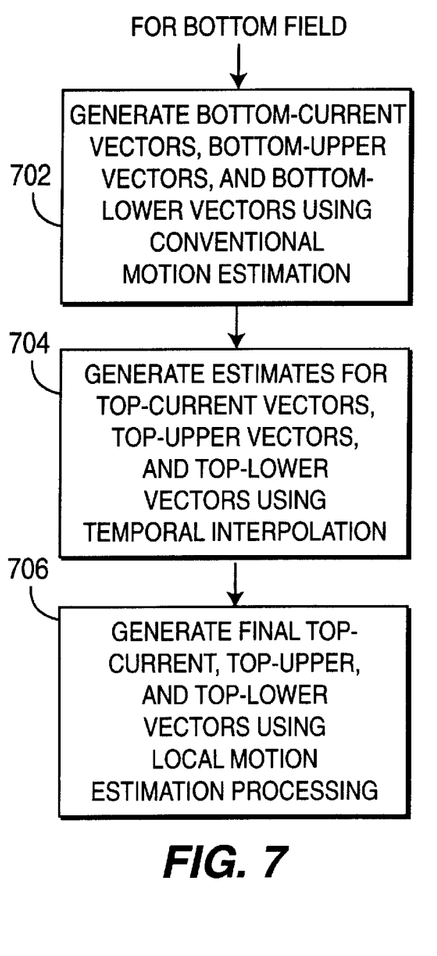
FIG. 7 shows a block diagram of the process for generating the six sets of motion vectors for MPEG-2 field picture coding, where the current field is a top field, according to one embodiment of the present invention.

FIG. 7 shows a block diagram of the process for generating the six sets of motion vectors for MPEG-2 field picture coding, where the current field is a bottom field, according to one embodiment of the present invention. According to this embodiment, three sets of motion vectors (i.e., the bottom-current vectors, the bottom-upper vectors, and the bottom-lower vectors) are generated (step 702 of FIG. 7), for example, using conventional motion estimation processing in which blocks of current image data are compared to search areas of reference image data to identify a motion vector for each block of current image data. Any conventional method for performing motion estimation can be used, including the exhaustive-search approach.

Rather than performing conventional motion estimation processing to generate the remaining three sets of motion vectors (i.e., the top-current vectors, the top-upper vectors, and the top-lower vectors), these last three sets of motion vectors are generated by applying temporal interpolation to the bottom-current vectors, the bottom-upper vectors, and the bottom-lower vectors, respectively (step 704). After estimates are generated for the top-current, top-upper, and top-lower vectors using temporal interpolation, local motion estimation can be performed to generate final motion vectors for these three sets of motion vectors (step 706).

When a hierarchical motion-estimation scheme is employed, memory bandwidth requirements can be reduced by estimating upper and lower vectors together (i.e., during the same pass through the hierarchical scheme, rather than in separate passes).

In the embodiments of FIGS. 6 and 7, three sets of vectors (e.g., bottom-current, bottom-upper, and bottom-lower for FIG. 6) are generated by applying temporal interpolation to three other sets of vectors (e.g., top-current, top-upper, and top-lower, respectively, for FIG. 6). The present invention can also be implemented using alternative schemes. For example, different combinations of three sets of vectors can be generated using temporal interpolation. In still other embodiments, four or five sets of vectors can be generated from one or two other sets of vectors. In still other embodiments, only one or two sets of field vectors are generated from other sets of vectors.

In general, the present invention can be characterized as the generation of one or more sets of motion vectors by applying temporal interpolation to one or more other sets of motion vectors. Generating motion vectors using temporal interpolation may not find block matches that are as good as those that can be found using conventional motion estimation techniques, even with local motion estimation implemented after the temporal interpolation. However, the temporal interpolation of the present invention can greatly reduce the overall processing requirements for the motion estimation step. The trade-off between quality of motion estimation and processing load can be used to determine empirically how many and which sets of motion vectors to generate using the temporal interpolation of the present invention as opposed to using conventional motion estimation techniques.

The present invention can be implemented in the context of different types of motion estimation schemes, including hierarchical schemes in which the original images are converted into images at one or more lower levels of resolution, estimates of motion vectors are generated using lower resolution images, the estimates are then refined using images at each successive higher level of resolution. In such a hierarchical scheme, the present invention could be applied within one or more of the different resolution levels to generate different sets of motion vectors using temporal interpolation.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for generating M sets of motion vectors for a current image, wherein each set of motion vectors corresponds to a different set of data in the current image, the method comprising the steps of:

(a) generating N sets of motion vectors for the current image, N being less than M; and (b) generating one or more additional sets of motion vectors for the current image by temporal interpolation based on one or more of the first N sets of motion vectors.

2. The invention of claim 1, wherein step (b) further comprises the step of performing a local search for each field vector generated by temporal interpolation.

3. The invention of claim 1, wherein:

the current image is a current frame;

step (a) comprises the step of performing block-based searching to generate a set of top-top field vectors and a set of bottom-bottom field vectors for the current frame; and step (b) comprises the steps of:

(1) generating a set of top-bottom field vectors for the current frame by temporally scaling the set of bottom-bottom field vectors; and (2) generating a set of bottom-top field vectors for the current frame by temporally scaling the set of top-top field vectors.

4. The invention of claim 3, wherein step (b) further comprises the step of performing a local search for each field vector generated by temporal scaling.

5. The invention of claim 3, further comprising the step of generating a set of frame vectors for the current frame by selecting field vectors from the sets of top-top and bottom-bottom field vectors having smaller error measures.

6. The invention of claim 1, wherein:
the current image is a current top field;
step (a) comprises the step of performing block-based searching to generate a set of top-current vectors, a set of top-upper vectors, and a set of top-lower vectors for the current top field; and
step (b) comprises the steps of:
(1) generating a set of bottom-current vectors for the current top field by temporally scaling the set of top-current vectors;
(2) generating a set of bottom-upper vectors for the current top field by temporally scaling the set of top-upper field vectors; and
(3) generating a set of bottom-lower vectors for the current top field by temporally scaling the set of top-lower field vectors.

7. The invention of claim 6, wherein step (b) further comprises the step of performing a local search using each field vector generated by temporal scaling to generate one or more sets of final motion vectors.

8. The invention of claim 6, wherein the motion vectors are generating using a hierarchical motion-estimation scheme, wherein upper and lower vectors are generated together.

9. The invention of claim 1, wherein:
the current image is a current bottom field;
step (a) comprises the step of performing block-based searching to generate a set of bottom-current vectors, a set of bottom-upper vectors, and a set of bottom-lower vectors for the current bottom field; and
step (b) comprises the steps of:
(1) generating a set of top-current vectors for the current bottom field by temporally scaling the set of bottom-current vectors;
(2) generating a set of top-upper vectors for the current bottom field by temporally scaling the set of bottom-upper field vectors; and
(3) generating a set of top-lower vectors for the current bottom field by temporally scaling the set of bottom-lower field vectors.

10. The invention of claim 9, wherein step (b) further comprises the step of performing a local search using each field vector generated by temporal scaling to generate one or more sets of final motion vectors.

11. The invention of claim 9, wherein the motion vectors are generating using a hierarchical motion-estimation scheme, wherein upper and lower vectors are generated together.

12. An apparatus for generating M sets of motion vectors for a current image, wherein each set of motion vectors corresponds to a different set of data in the current image, the apparatus comprising:
(a) means for generating N sets of motion vectors for the current image, N being less than M; and
(b) means for generating one or more additional sets of motion vectors for the current image by temporal interpolation based on one or more of the first N sets of motion vectors.

13. A computer-readable medium having stored thereon a plurality of instructions, the plurality of instructions including instructions which, when executed by a processor, cause the processor to implement a method for generating M sets of motion vectors for a current image, wherein each set of motion vectors corresponds to a different set of data in the current image, the method comprising the steps of:
(a) generating N sets of motion vectors for the current image, N being less than M; and
(b) generating one or more additional sets of motion vectors for the current image by temporal interpolation based on one or more of the first N sets of motion vectors.

14. The invention of claim 13, wherein step (b) further comprises the step of performing a local search for each field vector generated by temporal interpolation.

15. The invention of claim 13, wherein:
the current image is a current frame;
step (a) comprises the step of performing block-based searching to generate a set of top-top field vectors and a set of bottom-bottom field vectors for the current frame; and
step (b) comprises the steps of:
(1) generating a set of top-bottom field vectors for the current frame by temporally scaling the set of bottom-bottom field vectors; and
(2) generating a set of bottom-top field vectors for the current frame by temporally scaling the set of top-top field vectors.

16. The invention of claim 15, wherein step (b) further comprises the step of performing a local search for each field vector generated by temporal scaling.

17. The invention of claim 15, further comprising the step of generating a set of frame vectors for the current frame by selecting field vectors from the sets of top-top and bottom-bottom field vectors having smaller error measures.

18. The invention of claim 13, wherein:
the current image is a current top field;
step (a) comprises the step of performing block-based searching to generate a set of top-current vectors, a set of top-upper vectors, and a set of top-lower vectors for the current top field; and
step (b) comprises the steps of:
(1) generating a set of bottom-current vectors for the current top field by temporally scaling the set of top-current vectors;
(2) generating a set of bottom-upper vectors for the current top field by temporally scaling the set of top-upper field vectors; and
(3) generating a set of bottom-lower vectors for the current top field by temporally scaling the set of top-lower field vectors.

19. The invention of claim 18, wherein step (b) further comprises the step of performing a local search using each field vector generated by temporal scaling to generate one or more sets of final motion vectors.

20. The invention of claim 18, wherein the motion vectors are generating using a hierarchical motion-estimation scheme, wherein upper and lower vectors are generated together.

21. The invention of claim 13, wherein:
the current image is a current bottom field;
step (a) comprises the step of performing block-based searching to generate a set of bottom-current vectors, a set of bottom-upper vectors, and a set of bottom-lower vectors for the current bottom field; and step (b) comprises the steps of:
- (1) generating a set of top-current vectors for the current bottom field by temporally scaling the set of bottom-current vectors;
- (2) generating a set of top-upper vectors for the current bottom field by temporally scaling the set of bottom-upper field vectors; and
- (3) generating a set of top-lower vectors for the current bottom field by temporally scaling the set of bottom-lower field vectors.

22. The invention of claim 21, wherein step (b) further comprises the step of performing a local search using each field vector generated by temporal scaling to generate one or more sets of final motion vectors.

23. The invention of claim 21, wherein the motion vectors are generating using a hierarchical motion-estimation scheme, wherein upper and lower vectors are generated together.

24. The invention of claim 1, further comprising the step of coding the current image using the M sets of motion vectors.

25. The invention of claim 12, further comprising means for coding the current image using the M sets of motion vectors.

26. The invention of claim 13, wherein the method further comprises the step of coding the current image using the M sets of motion vectors.

* * * * *